(12) United States Patent
Nicholson et al.

(10) Patent No.: US 11,487,125 B2
(45) Date of Patent: Nov. 1, 2022

(54) LASER SAFETY IN WEARABLE HEADS-UP DISPLAYS

(71) Applicant: GOOGLE LLC, Mountain View, CA (US)

(72) Inventors: Stuart James Myron Nicholson, Waterloo (CA); Andrew S. Logan, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/229,523

(22) Filed: Apr. 13, 2021

(65) Prior Publication Data

US 2022/0269091 A1   Aug. 25, 2022

Related U.S. Application Data

(60) Provisional application No. 63/010,273, filed on Apr. 15, 2020.

(51) Int. Cl.
*G02B 27/01* (2006.01)
*G02B 27/18* (2006.01)
*G06F 1/16* (2006.01)

(52) U.S. Cl.
CPC ..... *G02B 27/0176* (2013.01); *G02B 27/0172* (2013.01); *G02B 27/18* (2013.01); *G06F 1/163* (2013.01); *G06F 1/1681* (2013.01); *G06F 1/1683* (2013.01); *G02B 2027/0178* (2013.01)

(58) Field of Classification Search
USPC ............................................................ 345/8
See application file for complete search history.

(56) References Cited

U.S. PATENT DOCUMENTS

| 6,421,031 | B1* | 7/2002 | Ronzani | G02B 27/017 |
| | | | | 359/630 |
| 10,642,050 | B1* | 5/2020 | Kothari | H04N 5/225251 |
| 2009/0051627 | A1* | 2/2009 | Ihata | G09G 3/3208 |
| | | | | 345/76 |
| 2013/0127980 | A1* | 5/2013 | Haddick | G06F 3/013 |
| | | | | 348/14.08 |
| 2016/0254681 | A1* | 9/2016 | Choi | G06F 1/3287 |
| | | | | 320/162 |
| 2019/0011699 | A1* | 1/2019 | Moore | G02B 27/0172 |
| 2019/0180483 | A1* | 6/2019 | DeLuca | G02B 27/0172 |

(Continued)

*Primary Examiner* — Chineyere D Wills-Burns

(57) ABSTRACT

Systems, devices, and methods provide for the prevention of laser light escaping a foldable wearable heads-up display (WHUD) when the WHUD is folded. For a WHUD that adopts the form factor of conventional eyeglasses or sunglasses, enabling the WHUD to fold "like glasses" can cause an interruption in the optical path of display light and enable display light to escape into the external environment. This can be hazardous when laser light is used to provide display light. Systems, devices, and methods that automatically detect, sense, and/or respond to the fold configuration state of a WHUD are described. When the WHUD is unfolded a laser-based display operates normally. When the WHUD is folded the laser-based display is disabled to prevent laser light from projecting out of the WHUD through the folded region. Proximity sensors and laser light containing mechanisms also may be employed as alternative or supplementary safety elements.

20 Claims, 5 Drawing Sheets

(56) References Cited

U.S. PATENT DOCUMENTS

| | | | | |
|---|---|---|---|---|
| 2020/0341282 A1* | 10/2020 | Mills | ........................ | G02C 5/22 |
| 2020/0393685 A1* | 12/2020 | Isaacs | ................ | G02B 27/0176 |
| 2021/0055565 A1* | 2/2021 | Moore | ............... | G02B 27/0176 |

* cited by examiner

LASER SAFETY IN WEARABLE HEADS-UP DISPLAYS

CROSS-REFERENCE TO RELATED APPLICATIONS

The present application claims priority to U.S. Provisional Patent Application Ser. No. 63/010,273, entitled "SYSTEMS, DEVICES, AND METHODS FOR LASER SAFETY IN WEARABLE HEADS-UP DISPLAYS" and filed on Apr. 15, 2020, the entirety of which is incorporated by reference herein.

BACKGROUND

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on. Because they are worn on the body of the user, and typically visible to others, and generally present for long periods of time, form factor (i.e., size, geometry, and appearance) is a major design consideration in wearable electronic devices.

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view (or both) so that it does not completely block the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames. Additionally, users also care about comfort. Since wearable heads-up displays are intended to be worn on the face of a user, wearable heads-up displays should comfortable, otherwise the user will quickly remove the wearable heads-up display due to strain. Wearable heads-up displays tend to be uncomfortable when they are too bulky or have unbalanced bulk.

A challenge in the design of wearable heads-up displays is to minimize and balance the bulk, volume, and weight of the face-worn apparatus while still providing displayed content with sufficient visual quality. There is a need in the art for wearable heads-up displays of more aesthetically-appealing and comfortable design that are capable of providing high-quality images to the user without limiting the user's ability to see their external environment. Further, it is desirable for a wearable heads-up display to fold, collapse, or otherwise shrink down in size when not being used, as this will make the wearable heads-up display take up less storage space and be more portable when not in use. Traditional eyeglasses typically fold at a pair of hinges connecting the temple arms to the front frame, such that the eyeglasses typically fit in a slim rectangular or cylindrical case. It is desirable to achieve similar folding in wearable heads-up displays, but this has proven challenging because electrical components often need to be electrically coupled across such hinges.

A projector is an optical device that projects or shines a pattern of light onto another object (e.g., onto a surface of another object, such as onto a projection screen) in order to display an image or video on or via that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional scanning laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Malfunction or improper use of laser devices can result in temporary or permanent damage to the eye; therefore, laser safety precautions are important in applications of laser devices. Safety measurements for lasers and laser devices include: the maximum permissible exposure (MPE) (i.e., the maximum amount of user exposure before damage occurs), and the accessible emission limit (AEL) (i.e., the emitted power of the laser that is accessible in use). MPE is measured as power density (W/cm$^2$ or J/cm$^2$) and AEL is measured as power (W or J) or power density (W/cm$^2$ or J/cm$^2$) depending on the specific laser wavelength.

BRIEF SUMMARY OF EMBODIMENTS

A wearable heads-up display ("WHUD") may be summarized as including: a support structure to be worn on a head of a user, the support structure comprising: a front frame; a first arm rotatably coupled to the front frame by a first hinge; and a second arm rotatably coupled to the front frame by a second hinge; a laser projector carried by the second arm; and a means for disabling the laser projector in response to the second arm entering into a folded configuration in relation to the front frame. The means for disabling the laser projector may be as described herein. The WHUD may further include a means for enabling the laser projector in response to the second arm entering into an unfolded configuration in relation to the front frame, as described herein.

A WHUD may be summarized as including: a support structure to be worn on a head of a user, the support structure comprising: a front frame; a first arm rotatably coupled to the front frame by a first hinge; and a second arm rotatably coupled to the front frame by a second hinge; a laser projector carried by the second arm; and a means for containing within the WHUD laser light output by the laser projector when the second arm is in a folded configuration in relation to the front frame. The means for containing within the WHUD laser light output by the laser projector may be as described herein.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is as "including, but not limited to." Reference throughout this specification to "one embodiment" or "an embodiment" means that a particular feature, structures, or characteristics may be combined in any suitable manner in one or more embodiments. As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. The headings and Abstract of the Disclosure provided herein are for convenience only and do not interpret the scope or meaning of the embodiments.

The various embodiments described herein provide systems, devices, and methods for laser safety in wearable heads-up display (WHUD) or "smart glasses" devices that employ one or more laser projectors or other laser devices. In particular, the present systems, devices, and methods address the problem of laser light undesirably escaping a WHUD when a mechanical configuration of the WHUD changes.

Figure 1:
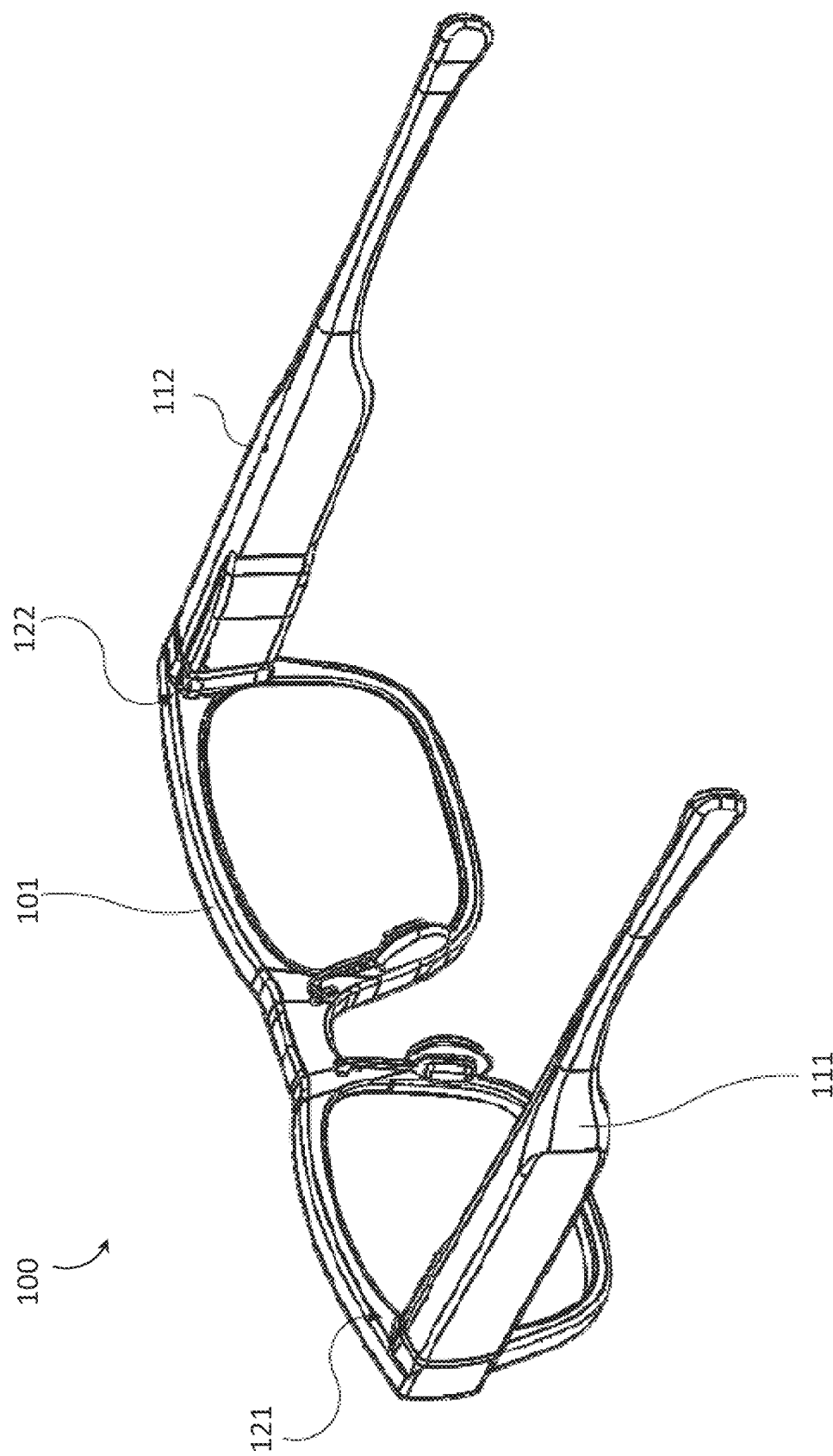
FIG. 1 is a perspective view of an exemplary wearable heads-up display that employs laser safety mechanisms in accordance with some embodiments.

FIG. 1 is a perspective view of an exemplary WHUD 100 that employs the laser safety mechanisms of the present systems, devices, and methods. WHUD 100 is advantageously designed to embody a form factor that at least approximates that of conventional eyeglasses or sunglasses. Accordingly, WHUD 100 comprises a support structure that includes a front frame 101, a first (e.g., left) temple arm 111 rotatably or foldably coupled to front frame 101 by a first hinge 121, and a second (e.g., right) temple arm 112 rotatably or foldably coupled to front frame 101 by a second hinge 122. In greater detail, physical coupling between first arm 111 and front frame 101 is mediated by first hinge 121 to enable first arm 111 to be moved (in relation to front frame 101) to and between at least two configurations: an unfolded configuration in which first arm 111 extends at least approximately perpendicularly out from front frame 101 (as depicted in FIG. 1) and a folded configuration in which first arm 111 extends at least approximately parallel to front frame 101. In both the unfolded configuration and the folded configuration, first arm 111 remains physically coupled to front frame 101 at and through first hinge 121. Likewise, physical coupling between second arm 112 and front frame 101 is mediated by second hinge 122 to enable second arm 112 to be moved (in relation to front frame 101) to and between at least two configurations: an unfolded configuration in which second arm 112 extends at least approximately perpendicularly out from front frame 101 (as depicted in FIG. 1) and a folded configuration in which second arm 112 extends at least approximately parallel to front frame 101. In both the unfolded configuration and the folded configuration, second arm 112 remains physically coupled to front frame 101 at and through second hinge 122.

Figure 2:
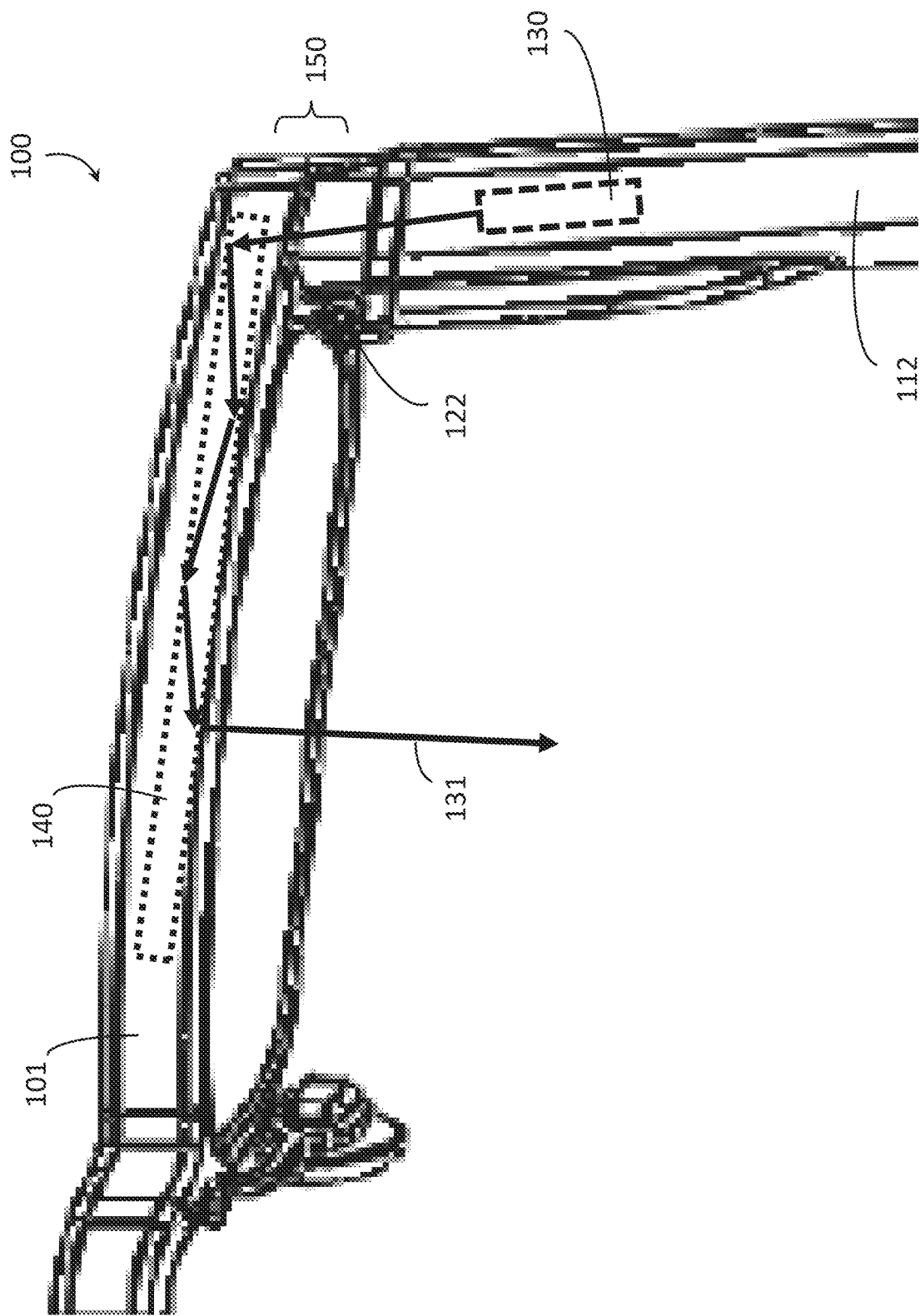
FIG. 2 is a top view of a portion of the wearable heads-up display from FIG. 1 showing detail of optics and laser devices used to provide a display capability in accordance with some embodiments.

FIG. 2 is a top view of a portion of WHUD 100 from FIG. 1 showing detail of optics and laser devices used to provide a display capability in accordance with the present systems, devices, and methods. As illustrated in FIG. 2, WHUD 100 includes laser projector 130 carried by (or within) second temple arm 112 and lightguide 140 carried by (or within) front frame 101. In operation, display light 131 that is output by laser projector 130 is projected in parallel with (or within) second arm 112 past second hinge 122 to impinge on lightguide 140 carried by (or within) front frame 101. Display light 131 propagates along a length of lightguide 140 until it is outcoupled towards the eye of (and into the field of view of) a user of WHUD 100 when the support structure of WHUD 100 is worn on the head of the user.

FIG. 2 depicts the illustrated portion of WHUD 100 in its unfolded configuration for which second temple arm 122 extends substantially perpendicularly to front frame 101. In this unfolded configuration display light 131 output by laser projector 130 is directed towards front frame 101. In particular, in the illustrated unfolded configuration an interface 150 exists between second arm 112 and front frame 101 at second hinge 122, and laser projector 130 projects display light 131 through or across such interface 150. That is, second arm 112 and front frame 101 each include respective internal volumes that are mated together at interface 150 such that while WHUD 100 is in the unfolded configuration laser light 131 output by projector 130 is generally contained within WHUD 100 and isolated from the external environment until controllably and predictably outcoupled by lightguide 140. This is in direct contrast to the situation where WHUD 100 is in a folded configuration, as depicted in FIG. 3.

Figure 3:
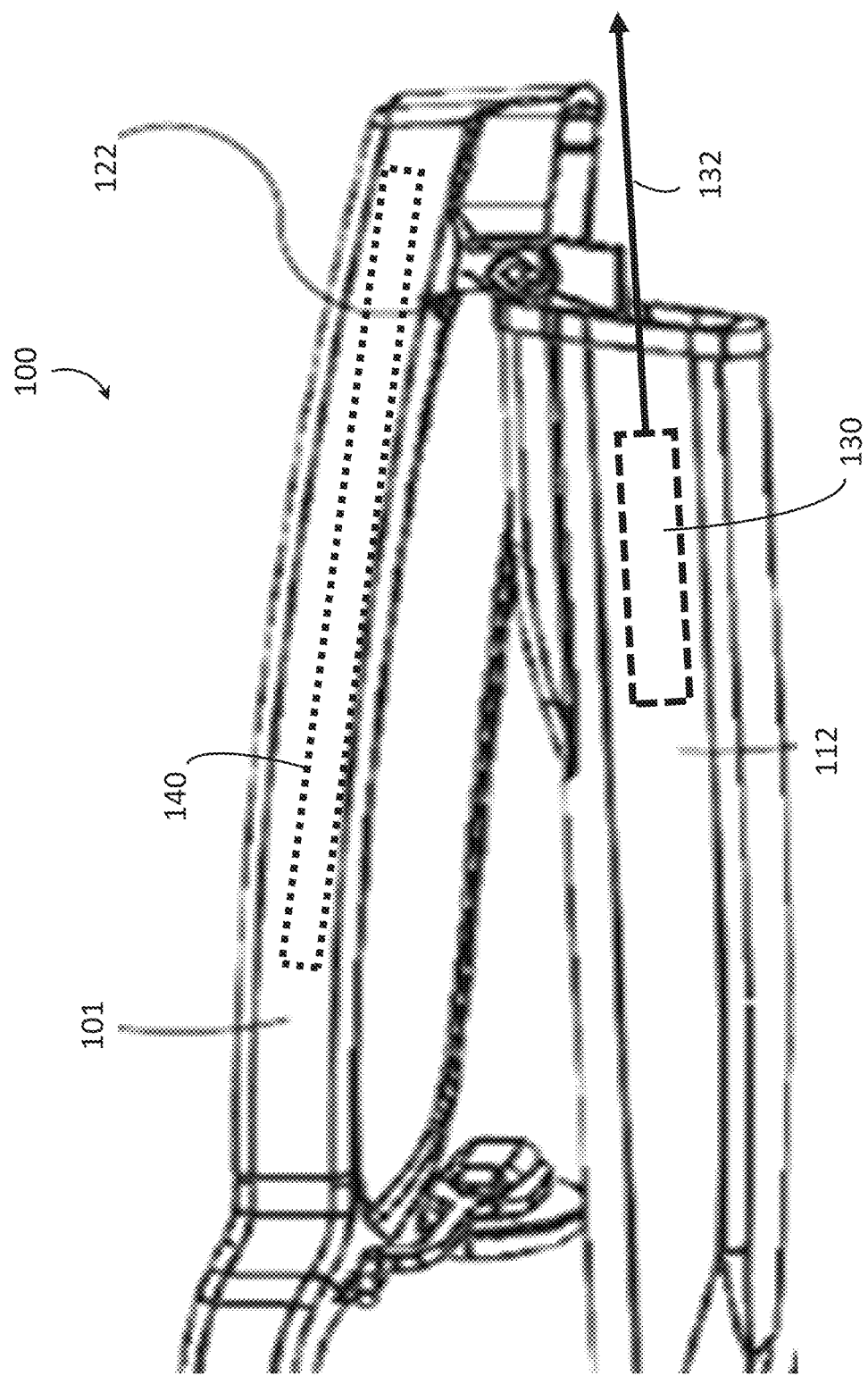
FIG. 3 is a top view of the portion of the wearable heads-up display from FIG. 2 shown in a folded configuration in accordance with some embodiments.

FIG. 3 is a top view of the portion of WHUD 100 from FIG. 2 shown in a folded configuration in accordance with the present systems, devices, and methods. In the folded configuration of WHUD 100 depicted in FIG. 3, laser light 132 that is output by laser projector 130 is emitted out of an end of second temple arm 112 and not received by lightguide 140 in front frame 101. This is because interface 150 between second arm 112 and front frame 101 that was present in the unfolded configuration of WHUD 100 depicted in FIG. 2 is not present in the folded configuration of WHUD 100 depicted in FIG. 3. Rotation or pivoting of second arm 112 about second hinge 122 to transition from the unfolded configuration to the folded configuration (i.e., moving second arm 112 from being substantially perpendicular to front frame 101 in the unfolded configuration to substantially parallel to front frame 101 in the folded configuration) separates, breaks, or interrupts interface 150 between second arm 112 and front frame 101 such that there is no longer coupling between the respective internal volumes of second arm 112 and front frame 101 and therefore the optical path of laser light 132 output by laser projector 130 no longer extends into front frame 101 to couple into lightguide 140.

In general, the optical path of laser light 131/132 output by laser projector 130 extends substantially parallel to, and collinear with, second arm 112 that houses laser projector 130. Thus, while second arm 112 is in the unfolded configuration depicted in FIG. 2 (and therefore oriented substantially perpendicular to front frame 101) laser light 131 extends out of second arm 112 in a direction substantially perpendicular to front frame 101 to pass through interface 150 and enter into lightguide 140; whereas while second arm 112 is in the folded configuration depicted in FIG. 3 (and therefore oriented substantially parallel to front frame 101) laser light 132 extends out of second arm 112 in a direction substantially parallel to front frame 101 and escapes out into the external environment. This scenario is potentially dangerous because escaped laser light 132 emitted out of an end of second arm 112 could become incident on or otherwise shine on any one or number of light-sensitive object(s) in the environment of WHUD 100, such as the eye of another person. The risk is compounded by the fact that laser light 132 at the point where laser light 132 is emitted from second arm 112 is necessarily higher power than laser light 131 at the point where laser light 131 is outcoupled by lightguide 140 towards the eye of a user of WHUD 100, because lightguide 140 (including the optics employed for coupling laser light 131 into and out of lightguide 140) attenuates laser light 131 to some degree and laser light 132 does not experience this attenuation. Rather, laser light 132 may be deliberately output at a high power to compensate for the attenuation expected through lightguide 140, in which case it may be particularly dangerous when laser light 132 escapes through an end of second arm 112 when second arm 112 is in the folded configuration.

The present systems, devices, and methods address the safety concern identified above. Specifically, the various embodiments described herein provide systems, devices, and methods for preventing a laser-based WHUD (such as WHUD 100) from emitting laser light (e.g., 132) into its environment when entered into the folded configuration. Such may include any or all of: detecting a state of a hinge (e.g., hinge 122), automatically disabling or deactivating one or more laser diode(s) based on the state of the hinge, automatically disabling or deactivating one or more laser projector(s) based on the state of the hinge, detecting a "fold configuration state" of a WHUD (i.e., whether the WHUD is in a folded configuration or an unfolded configuration), automatically disabling or deactivating one or more laser diode(s) based on the fold configuration state of the WHUD, automatically disabling or deactivating one or more laser projector(s) based on the fold configuration state of the WHUD, detecting a state of an optical path from the laser projector to the lightguide and disabling or deactivating one or more laser diode(s)/laser projector(s) based on the state of such optical path, shuttering an optical output of a laser diode/laser projector/temple arm depending on the fold configuration state of the WHUD, and/or occluding or otherwise blocking laser light from escaping the WHUD when the WHUS is entered into the folded configuration.

In an example implementation, the power to the laser driver may be physically decoupled when the WHUD is entered into a folded configuration (and thus power to the laser driver may be physically coupled when the WHUD is entered into an unfolded configuration). With one or more power source(s) carried in the first temple arm (111) of the WHUD, a power coupler may route from such power source(s), through the front frame (101) of the WHUD, and across the second hinge (122) to couple to the laser projector (130) in the second temple arm (112). This power coupling may be broken, severed, or otherwise interrupted when the WHUD is folded. However, this decoupling could conceivably be defeated (if a user so desired) by a paperclip/ball of foil. Thus, an improvement may include routing both power and ground for the laser driver run across the second hinge (122), such that both the power connection and the ground connection are broken, severed, or otherwise interrupted when the WHUD is folded. In this case, simply applying a paperclip or ball of foil across the electrical connections when the WHUD is folded would simply short the battery and not circumvent the safety shutoff. Such circumvention would require a complicated two-connector bridge where the connectors cannot contact.

Figure 4:
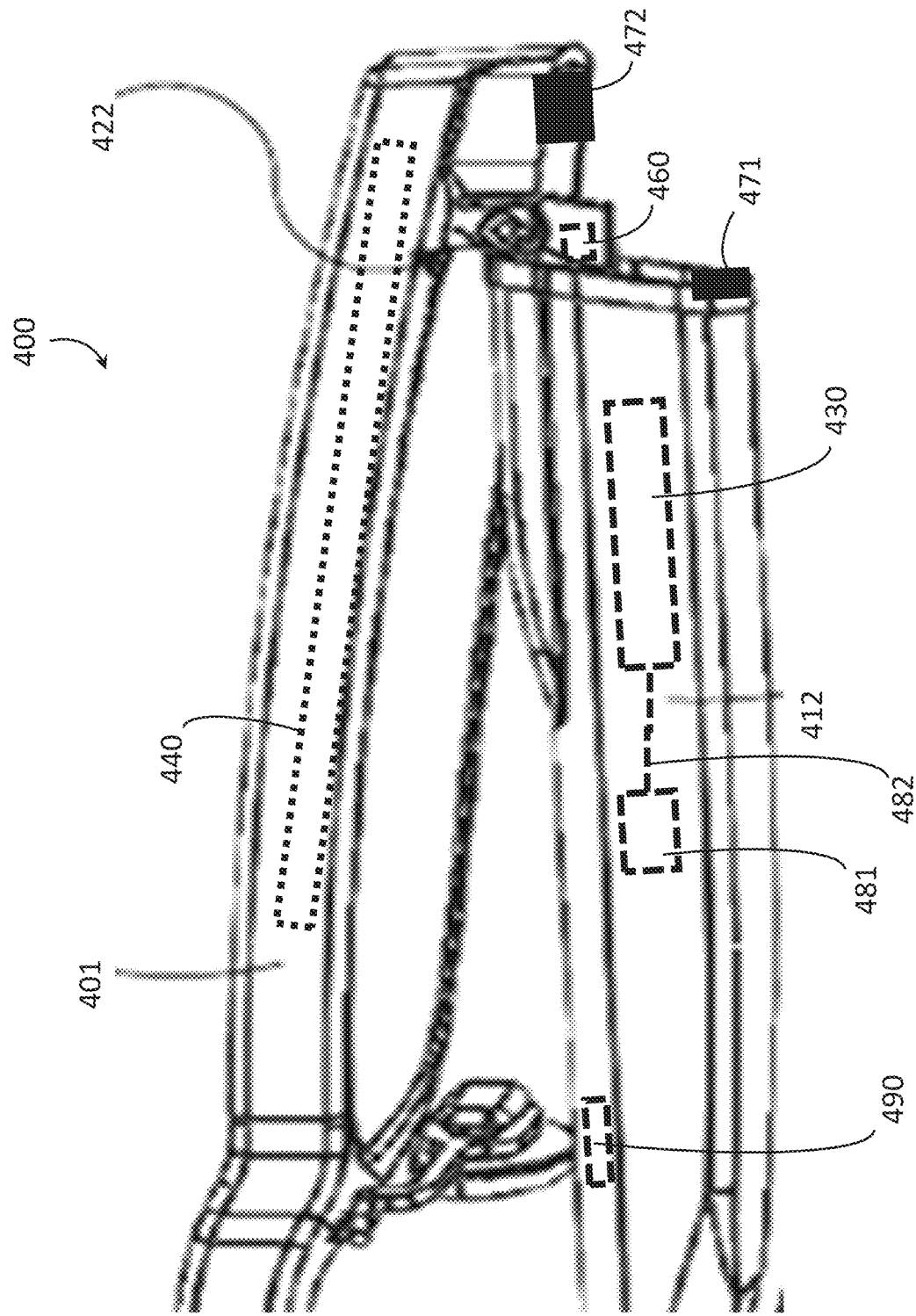
FIG. 4 is a top plan view of a portion of a wearable heads-up display that implements an automatic laser safety shutoff when the wearable heads-up display is in a folded configuration in accordance with some embodiments.

FIG. 4 is a top plan view of a portion of a WHUD 400 that implements an automatic laser safety shutoff when WHUD 400 is in a folded configuration in accordance with the present systems, devices, and methods. WHUD 400 is substantially similar to WHUD 100 and includes additional features not illustrated in WHUD 100. For example, WHUD 400 includes first electrical contact 471 positioned at an end of second temple arm 412 and communicatively coupled (communicative coupling not shown to reduce clutter) to at least one of laser projector 430 and/or controller 481. Controller 481 is communicatively coupled (via communicative coupling 482) to laser projector 430 and is operable to control the output of laser light from laser projector 430. WHUD 400 also includes second electrical contact 472 positioned on front frame 401 and aligned to receive or otherwise mate with first electrical contact 471 (i.e., at an equivalent of interface 150) when WHUD 400 is in an unfolded configuration. Second electrical contact 472 may be communicatively coupled to at least one power source (not shown) which may be carried by a first temple arm of WHUD 400 (not shown). Thus, when WHUD 400 is in the folded configuration (as illustrated in FIG. 4) there is no coupling of power to controller 481 and/or laser projector 430 and thus no output of laser light from laser projector 430, but when WHUD 400 is in the unfolded configuration electrical power is coupled from second electrical contact 472 to first electrical contact 471 and routed to drive the output of laser light form laser projector 430.

In another example implementation, a signal may be transmitted across second hinge 422 into a U-turn conductor and a microcontroller (e.g., controller 481) may receive the output of the U-turn. In this case, contacts 471 and 472 of WHUD 400 may correspond to two respective ends of the U-turn conductor which break, separate, or otherwise interrupt when WHUD 400 is folded to prevent the signal from being received by the microcontroller (481) when WHUD 400 is folded. In order to prevent this safety system from being circumvented using a simple conductor such as a paperclip or ball of foil, the signal transmitted across second hinge 422 may be modified by the U-turn connector and the microcontroller 481 may deactivate the laser projector 430 if the modified signal is not received. For example, the transmitted code could be a square wave and the U-turn conductor could include a capacitor which modifies the square wave. In this case, microcontroller 481 may require receipt of the modified signal to power laser projector 430 and receipt of an unmodified signal (e.g., resulting from a conductive bridge applied across electrical contacts 471 and 472) would trigger a shutoff of laser projector 430. In some implementations, the transmitted signals may employ Barker codes.

In another example implementation, dedicated light may be transmitted between second temple arm 412 and front frame 401 for the purpose of determining the fold configuration state of WHUD 400. For example, in this implementation second arm 412 may include a light source 471 and front frame 401 may include a photodiode 472. WHUD 400 (e.g., controller 481) may identify that WHUD 400 is in the unfolded configuration when photodiode 472 receives light from light source 471 and WHUD 400 (e.g., controller 481) may identify that WHUD 400 is in the folded configuration when photodiode 472 does not receive light from light source 471. In some implementations, light source 471 may advantageously include an invisible light source, such as infrared light. Light source 471 may also advantageously be low power so that light emitted thereby does not impose a safety hazard when WHUD 400 is in the folded configuration. Photodiode 472 may be optimized to sense light of a specific wavelength (or within a specific waveband) corresponding to the wavelength/waveband of light output by light source 471. In alternative configurations, both light source 471 and photodiode 472 may be positioned on a same side of hinge 422 and a mirror may be positioned on the opposite side to reflect light from light source 471 back towards the photodiode. For example, object 471 in FIG. 4 may correspond to both an infrared light source and an infrared photodetector and object 472 may correspond to a mirror that reflects infrared light from light source 471 back to photodetector 471 when WHUD 400 is in the unfolded configuration. In alternative implementations, light from light source 471 may be routed through lightguide 440 and detected at any point therealong by a strategically placed photodiode (not shown) in order to validate not only to the fold configuration state of WHUD 400 but also the effectiveness of the optical path through lightguide 440 (e.g., such would help identify if a break or misalignment has occurred in lightguide 440).

Optical methods of checking the position of the temple 412 relative to the front frame 401 include: (1) having a light source 472 in the front frame 401 and a photodetector 471 in the temple 412 that detects light from the light source 472, and (2) placing a photodiode at the back of (in stack with) the in-coupler on the lightguide 440 and sending a test light to the in-coupler (the output of the photodiode can be evaluated to see if the light was received). Instead of placing a photodiode at the back of the in-coupler, a mirror may be placed there to reflect the light back—in this case a photodetector in the temple 412 may detect the light.

In another example implementation, WHUD 400 may include a mechanical switch 460 that mechanically detects the fold configuration state of WHUD 400. When mechanical switch 460 detects that WHUD 400 is in the unfolded configuration switch 460 enables power to laser projector 430 and when switch 460 detects that WHUD 400 is in the folded configuration switch 460 disables power to laser projector 430 (either directly or via controller 481).

In general, some implementations may employ a switch between the power subsystem and the laser power source (or between the laser power source and the laser module 430), where the switch responds to the position of the temple 412 relative to the front frame 401.

One example of a switch that may be used in accordance with the present systems, devices, and methods is a "push to make switch" button that allows electricity to flow between its two contacts when depressed. When the button is released, the circuit is broken. A push to make switch button could be attached to the temple 412 (for example as object 471 in FIG. 4) and coupled between the power subsystem and the laser power source. When the temple 412 is in the unfolded configuration, the button may be depressed between the temple 412 and front frame 401 (e.g., at an equivalent of interface 150), which may allow electrical power to flow from the power subsystem to the laser power source. In the folded configuration of the temple 412, the button is released and power to laser projector 430 is cutoff.

In some implementations, instead of or in addition to systems, methods, and devices for detecting and/or responding to the fold configuration state of a WHUD 400, WHUD 400 may include a proximity sensor 490 positioned and oriented to sense, detect, or otherwise determine when WHUD 400 is worn on a head of a user. Proximity sensor 490 may be communicatively coupled (not shown) to controller 481 and information from proximity sensor 490 may be used by controller 481 to control or influence the operation of laser projector 430. For example, when proximity sensor 490 detects that WHUD 400 is worn on a head of a user this information may be used by controller 481 to enable power to laser projector 430, and when proximity sensor 490 does not detect that WHUD 400 is worn on the head of the user this information may be used by controller 481 to disable power to laser projector 430. As stated above, some implementations may combine both proximity detection/response and fold configuration state detection/response in a single WHUD, as is the case in WHUD 400.

Figure 5:
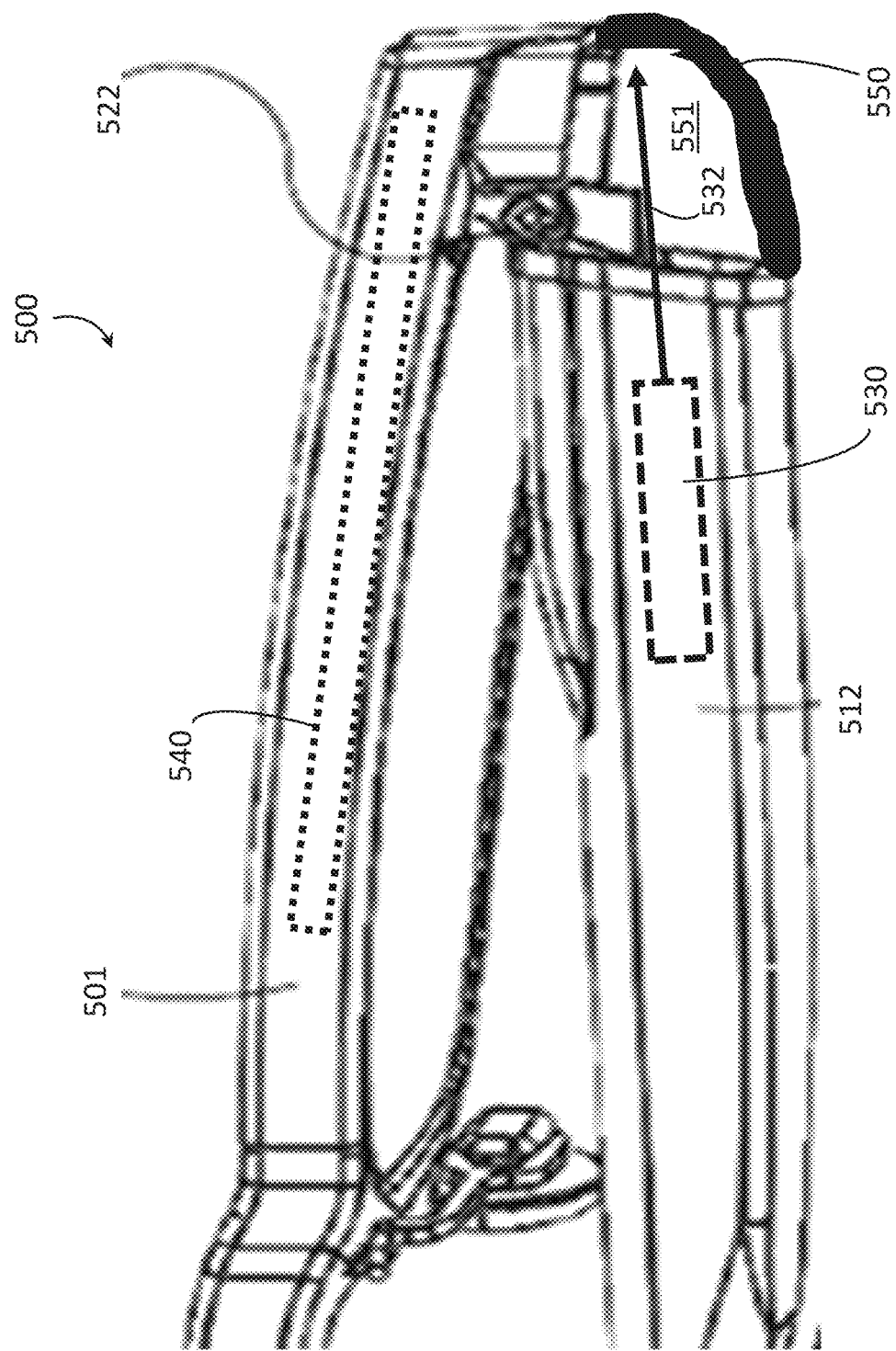
FIG. 5 is a top view of a portion of a wearable heads-up display in accordance with some embodiments.

As previously described, some implementations of the present systems, devices, and methods may include shuttering and/or occluding laser safety mechanisms either instead of or in addition to the active laser disabling mechanisms described above. FIG. 5 is a top view of a portion of a WHUD 500 in accordance with the present systems, devices, and methods. WHUD 500 is substantially similar to WHUD 100 (and may be substantially similar to WHUD 400) and further includes an occluding or "laser light containment" mechanism in the form of a sock or sleeve 550 that surrounds, encompasses, or encapsulates the gap 551 that forms between temple arm 512 and front frame 501 when WHUD 500 is in the folded configuration. Sock or sleeve 550 may be formed of any optically opaque material suitable to accommodate the motion of temple arm 512 relative to front frame 501 and, advantageously, of aesthetically pleasing style or design. As illustrated, when a laser light containment mechanism such as sock or sleeve 550 is employed laser projector 530 may remain active even in the folded configuration and laser light 531 may nevertheless be preventing from escaping into the external environment of WHUD 500.

In some implementations, an actuatable (e.g., slidable or otherwise displaceable) shutter may be employed, where such actuatable shutter moves into place to cover the open end of the temple 512 when the temple 512 is folded and moves out of the way when the temple 512 is unfolded. An actuator may be employed to move the shutter in and out, or alternatively the motion of the shutter may be mechanically coupled to the motion of the hinge when the fold configuration state of WHUD 500 is changed.

In some implementations, shutters, sleeves, and/or other laser light containment mechanisms may be employed as standalone solutions to the problem of laser light escaping when a WHUD is in a folded configuration. However, this can result in unnecessary waste of power. Thus, in other implementations it can be advantageous to combine any or all of the various systems, devices, and/or methods described herein so that, for example, even if the open end of a temple is closed by a shutter the laser projector is still deactivated while the shutter is closed. The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed. The WHUDs described herein may include one or more onboard power sources (e.g., one or more battery(ies)), a wireless transceiver for sending/receiving wireless communications, and/or a tethered connector port for coupling to a computer and/or charging the one or more on-board power source(s). The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable storage medium" can be any element that can store the program associated with logic and/or information for use by or in connection with the instruction execution system, apparatus, and/or device. The processor-readable storage medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A wearable heads-up display (WHUD) comprising:
a support structure configured to be worn on a head of a user, the support structure comprising:
a front frame;
a first arm rotatably coupled to the front frame by a first hinge; and
a second arm rotatably coupled to the front frame by a second hinge;
a laser projector carried by the second arm; and
means for disabling the laser projector in response to the second arm entering into a folded configuration in relation to the front frame and for enabling the laser projector in response to the second arm entering into an unfolded configuration in relation to the front frame.

2. The WHUD of claim 1, wherein the means comprises a first power connector having a first conductive contact on the front frame and a second conductive contact on the second arm such that when the second arm is in the unfolded configuration the first conductive contact and the second conductive contact are placed in physical contact and when the second arm is in the folded configuration the first conductive contact and the second conductive contact are removed from being in physical contact.

3. The WHUD of claim 2, wherein the means further comprises a second power connector having a third conductive contact on the front frame and a fourth conductive contact on the first arm such that when the first arm is in the unfolded configuration the third conductive contact and the fourth conductive contact are placed in physical contact and when the first arm is in the folded configuration the third conductive contact and the fourth conductive contact are removed from being in physical contact.

4. The WHUD of claim 3, wherein power to the laser projector is routed through the second power connector and the first power connector in series.

5. The WHUD of claim 1, wherein the means comprises:
a controller to transmit a signal;
a U-turn connector disposed at the second hinge and configured to selectively modify the signal based on whether the second arm is in the folded configuration or the unfolded configuration; and
wherein the controller selectively powers the laser projector based on whether the signal has been modified.

6. The WHUD of claim 5, wherein the signal comprises a square wave signal and the U-turn connector has a capacitor to selectively modify the square wave signal based on whether the second arm is in the folded configuration or the unfolded configuration.

7. The WHUD of claim 1, wherein the means comprises:
a light source independent of the laser projector, the light source to transmit light between the second arm and the front frame; and
a photodetector configured to detect the transmitted light to determine whether the second arm is in the folded configuration or the unfolded configuration; and
a controller to selectively enable the laser projector based on an output of the photodetector.

8. The WHUD of claim 7, wherein the light source and photodetector are disposed on opposite sides of the second hinge.

9. The WHUD of claim 7, wherein the light source and photodetector are disposed on a same side of the second hinge and opposite of a mirror disposed at an opposite side of the second hinge.

10. The WHUD of claim 1, wherein the means comprises:
a mechanical switch disposed at the second hinge and configured to selectively interrupt flow of current to the laser projector depending on whether the second arm is in the folded configuration or the unfolded configuration.

11. The WHUD of claim 1, wherein the means comprises a proximity detector configured to detect proximity of a head of a user to the WHUD and a controller to selectively enable the laser projector based on the detected proximity.

12. A wearable heads-up display (WHUD) comprising:
a support structure to be worn on a head of a user, the support structure comprising:
a front frame;
a first arm rotatably coupled to the front frame by a first hinge; and
a second arm rotatably coupled to the front frame by a second hinge;
a laser projector carried by the second arm; and
means for containing within the WHUD laser light output by the laser projector when the second arm is in a folded configuration in relation to the front frame.

13. The WHUD of claim 12, wherein the means comprises a shutter that is selectively positioned between the laser projector and an exit point of the second arm for laser light from the laser projector depending on whether the second arm is in the folded configuration or an unfolded configuration.

14. The WHUD of claim 12, wherein the means comprises sleeve that encapsulates the second hinge when the second arm is in the folded configuration.

15. A method for a wearable heads-up display (WHUD) comprising a support structure configured to be worn on a head of a user, the support structure comprising a front frame, a first arm rotatably coupled to the front frame by a first hinge, a second arm rotatably coupled to the front frame by a second hinge, and a laser projector carried by the second arm, the method comprising:
- detecting a fold configuration of the second arm;
- transmitting either a signal or a modified version of the signal across the second hinge based on whether the second arm is in a folded configuration or an unfolded configuration; and
- selectively disabling the laser projector based on whether the signal or the modified version of the signal is transmitted across the second hinge.

16. The method of claim 15, wherein selectively disabling the laser projector comprises:
- enabling the laser projector when the second arm is in an unfolded configuration; and
- disabling the laser projector when the second arm is in a folded configuration.

17. The method of claim 15, wherein transmitting either the signal or the modified version of the signal comprises transmitting the signal or the modified version of the signal through a U-turn connector disposed at the second hinge.

18. The method of claim 17, wherein the signal is a square wave signal and the U turn connector has a capacitor to modify the square wave signal based on whether the second arm is in the folded configuration or the unfolded configuration.

19. The method of claim 15, wherein detecting the fold configuration of the second arm comprises:
- transmitting light between the second arm and the front frame using a light source separate from the laser projector; and
- detecting, via a photodetector, the transmitted light to determine whether the second arm is in a folded configuration or an unfolded configuration.

20. The method of claim 15, wherein detecting the fold configuration of the second arm comprises:
- detecting whether a head of a user is in proximity to the WHUD.

* * * * *